United States Patent [19]
Levine et al.

[11] Patent Number: 5,331,857
[45] Date of Patent: Jul. 26, 1994

[54] PRESSURE TRANSDUCER

[75] Inventors: Mark Levine, Plainview, N.Y.; William T. Holmes, Jackson; Edward W. Baumgartner, Somerset, both of N.J.; Herman W. Erichsen, Holliston; Louis J. Panagotopulos, Walpole, both of Mass.

[73] Assignee: General Automotive Specialty Co., Inc., North Brunswick, N.J.

[21] Appl. No.: 934,185

[22] Filed: Aug. 21, 1992

[51] Int. Cl.[5] ............................................. G01L 21/12
[52] U.S. Cl. ................................... 73/756; 73/706
[58] Field of Search ............ 73/756, 720, 721, 726, 73/727, 706; 338/4, 42; 29/621.1

[56] References Cited

U.S. PATENT DOCUMENTS

| | | | |
|---|---|---|---|
| 2,979,680 | 4/1961 | Bean, Jr. | 336/5 |
| 3,303,451 | 7/1967 | Yuan | 338/4 |
| 3,520,191 | 7/1970 | Pien | 73/398 |
| 4,264,889 | 4/1981 | Yamamoto et al. | 338/42 |
| 4,299,129 | 10/1981 | Ritzinger | 73/746 |
| 4,327,350 | 4/1982 | Erichsen | 338/4 |
| 4,368,575 | 1/1983 | Erichsen et al. | 338/4 |
| 4,414,851 | 11/1983 | Maglic | 73/706 |
| 4,993,267 | 2/1991 | Allard et al. | 73/726 |
| 5,058,436 | 10/1991 | Bellec et al. | 73/727 |
| 5,095,741 | 3/1992 | Bartig et al. | 73/756 |
| 5,174,014 | 12/1992 | Erichsen et al. | 29/621.1 |

*Primary Examiner*—Richard E. Chilcot, Jr.
*Assistant Examiner*—William Oen
*Attorney, Agent, or Firm*—Darby & Darby

[57] ABSTRACT

A beam-type strain gage pressure transducer is disclosed having strips of piezo-resistive material supported on a sensing beam, one being subject to compression and another to tension in response to applied pressure. The beam structure may be made by screw machine techniques to form a beam integral with a circular base structure. A highly flexible diaphragm permits force generated by application of pressure to be transmitted entirely to the beam. Components and construction are suited to high production and automated assembly techniques.

20 Claims, 3 Drawing Sheets

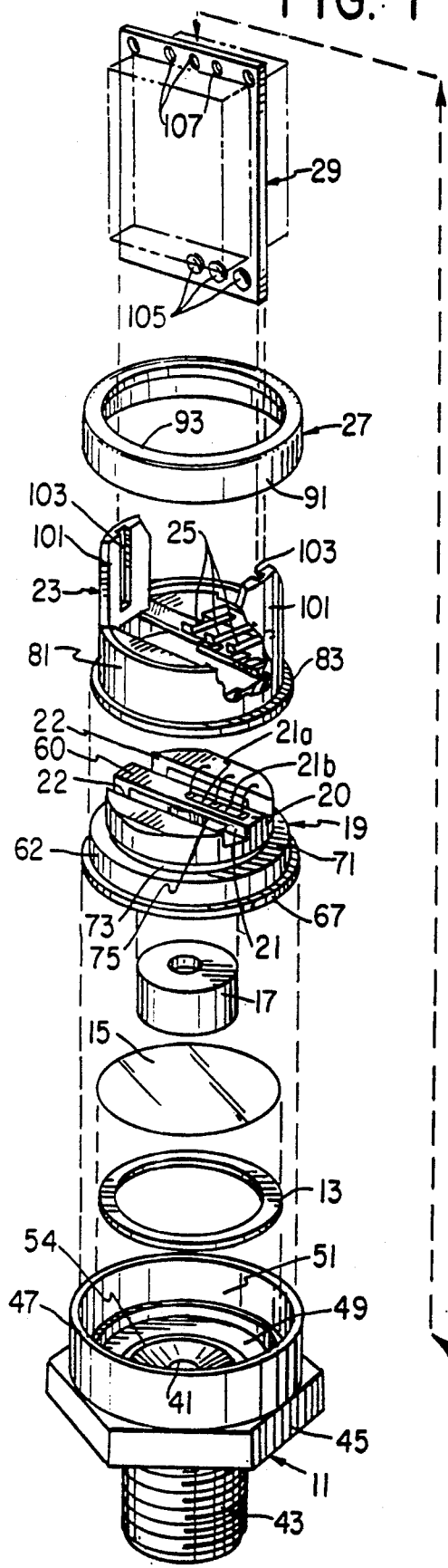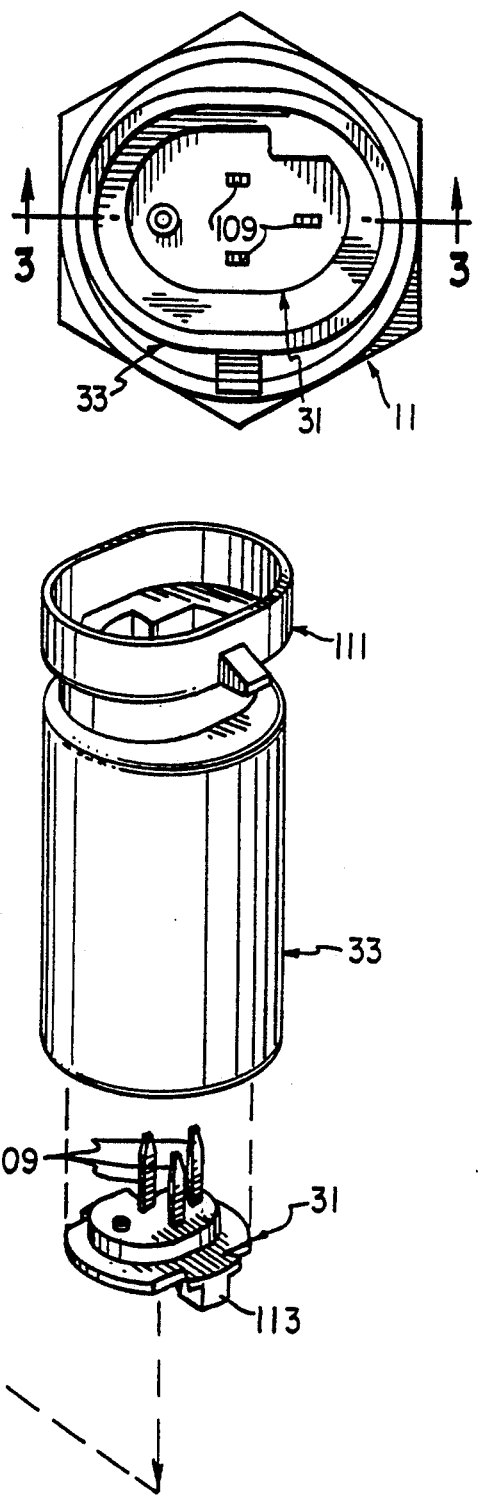

FIG. 3
FIG. 4
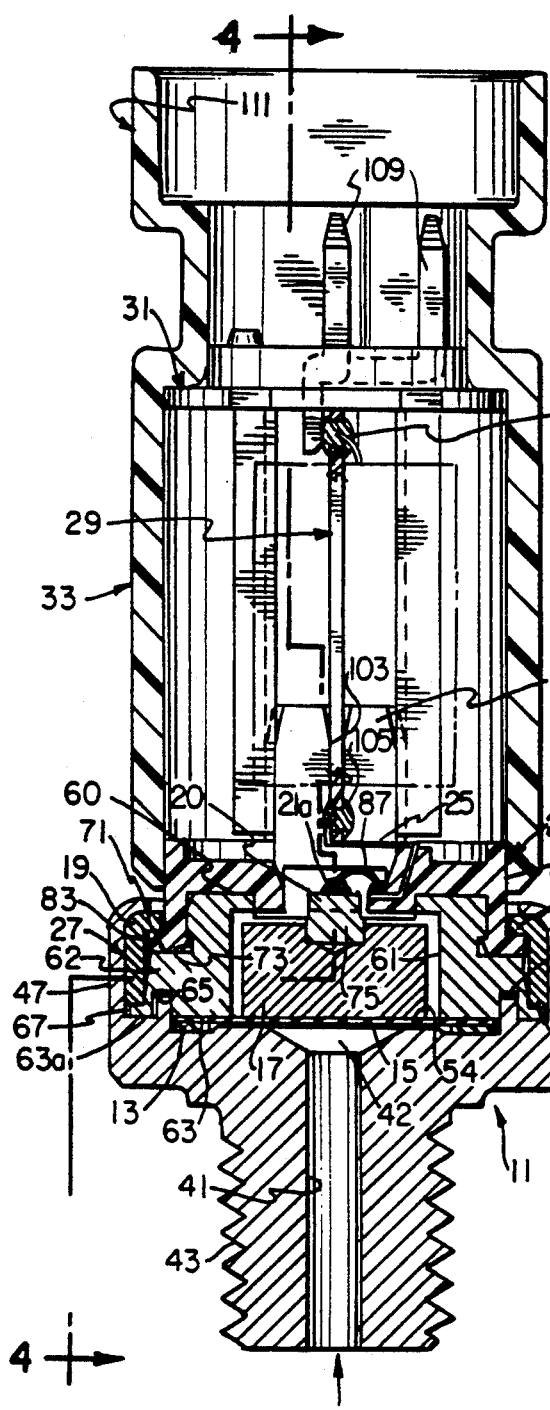
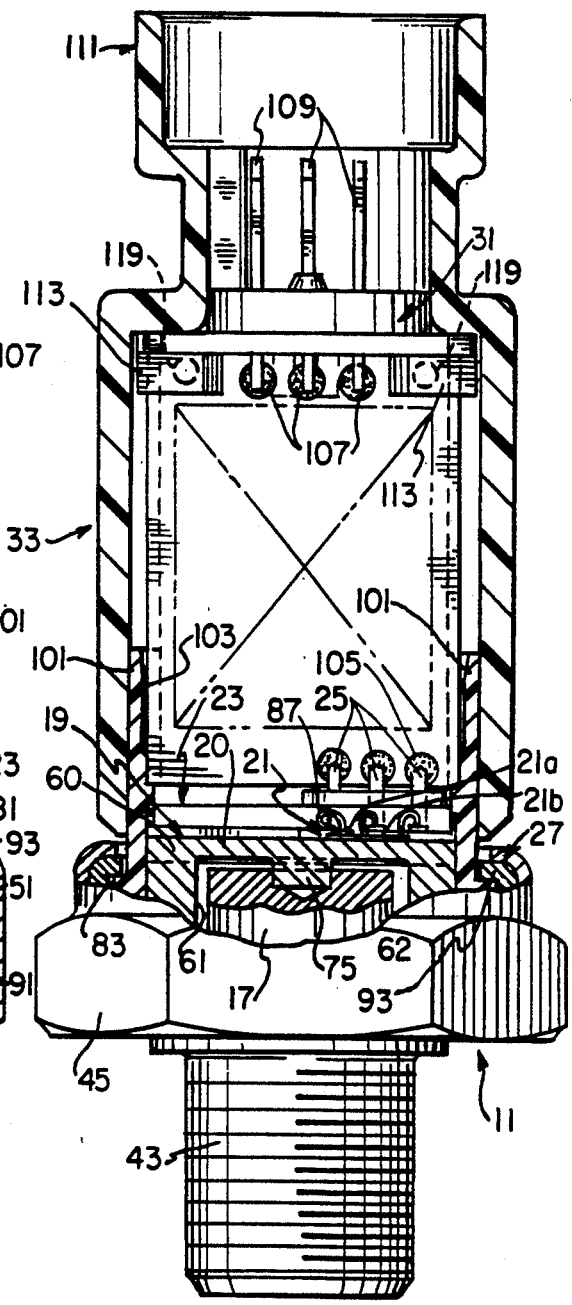

PRESSURE TRANSDUCER

The present invention relates generally to pressure transducer and more particularly to strain gage pressure transducers especially adapted to sensing oil pressure in internal combustion engines and other applications.

In conventional usage, engine oil pressure is sensed by a wire-wound rheostat which is mechanically activated in response to pressure applied to a diaphragm. The variation in resistance thus produced controls the current in a galvanometer-operated gage on an instrument panel. Such pressure sensors (usually called "senders") are economical, but are inherently of low accuracy and subject to mechanical failure, particularly due to wear caused by action of a wiper passing over the resistance element, the effect of debris created by the wear in affecting the resistance of the rheostat, the tendency of the rheostat surface to oxidize under the high temperatures of the engine environment, and fatigue cracking of the diaphragm because of its needed flexibility to provide the required relatively large diaphragm motion to actuate the rheostat wiper.

A class of sensors is known (beam-type sensors) utilizing semiconductor strain gages mounted on relatively rigid pressure sensors, responding to small diaphragm deflections and hence permitting fabrication of diaphragms from thicker metal or ceramic materials and reducing diaphragm failure. However, the cost of such beam-type sensors (usually called "transducers") is considerably higher than the rheostat sensors, partly because of the greater precision required for the sensor elements and the process requirements for assembling the components.

The present invention constitutes an improvement in beam-type strain gage pressure transducers, such as described in Erichsen U.S. Pat. No. 4,327,350 for Pressure Transducer issued to Data Instruments Inc. on Apr. 27, 1982. Such beam-type transducers generally comprise a diaphragm and a sensing beam arranged so that deflection of the diaphragm causes the beam to deflect. In such designs both the beam and the diaphragm offer resistance to pressure-induced deflection and the dimensions and proportions of these elements are selected to avoid destructive stresses while providing adequate strain in the beam to allow accurate sensing of pressure. Two strips of piezo-resistive material are supported on the sensing beam so that one of them is subject to compression and the other to tension when the diaphragm causes the beam to deflect in response to pressure asserted against the diaphragm. These two strain gage elements are then connected into a Wheatstone bridge including two additional resistors, with the strain gage elements forming one half of the bridge configuration. Application of pressure to the diaphragm causes the beam to deflect proportionally to the pressure applied, which causes a change in the resistivity of the strain gage elements. This changes the balance of the Wheatstone bridge to produce an output proportional to the pressure applied.

The beam-type transducer permits design flexibility. Its diaphragm can be made of various corrosion-resistant materials and the sensing module can be protected from the media whose pressure is being measured (e.g., engine oil) by selecting an appropriate material for the diaphragm suited to the use to which the transducer is put. The measuring range of the device can be determined by selection of the beam thickness, length, width and material.

According to the present invention, an improved design of a beam-type transducer is provided in which the various components may be readily and inexpensively produced and assembled. The present invention thereby provides an improved and economical construction and method of manufacture for such transducers, with good reproducibility for mass production, using only usual tolerances while avoiding excessive variations in production.

The present invention combines the low cost of flexible diaphragm construction with strain gage technology. The small movement of the diaphragm permits the selection of material and thickness of the diaphragm to provide optimum leak resistance and durability without concern for sacrificing performance. Further, the highly flexible diaphragm offers essentially no resistance to pressure-induced deflection and the force generated by the application of pressure is transmitted entirely to and resisted entirely by the beam. In addition, the invention utilizes simply fabricated components and construction details suited to high production and automated assembly techniques.

As described in more detail below, the active pressure-sensing element is a strip of silicon mounted on a beam. The beam structure is fabricated by screw machine techniques milled to form a beam integral with a circular base structure. The dimensions of the beam are matched to a specific pressure rating of the sensor and are easily controlled during fabrication. The silicon strip forms two end-to-end sensing elements, arranged so that one is compressed and the other placed in tension by beam deflection upon diaphragm displacement. The resulting increase in electrical resistance of one and decrease of resistance of the other serve to actuate an appropriate indicator.

It is an object of the present invention to provide an improved structure of and method of producing pressure transducers and providing improved reliable transducers with economical and rapid assembling.

Another object of the present invention is to provide a method of producing pressure transducers from relatively inexpensively produced parts, providing excellent reliability and reproducibility.

Yet another object is to provide a simplified way to produce the beam structure for a beam-type pressure transducer.

Another object is to provide a rigid sub-assembly including a beam structure which provides stability against variations in performance as a result of vibration and other environmental factors.

A further object is to provide enhanced sealing integrity in such a transducer.

Other features and advantages of the invention will be apparent from the following detailed description considered in conjunction with the accompanying drawings in which:

FIG. 1 shows an exploded view of the various components forming the pressure transducer of the present invention.

FIG. 2 is a top plan view of the assembled transducer of FIG. 1.

FIG. 3 is a longitudinal cross-sectional view of the assembled transducer of FIGS. 1 and 2.

FIG. 4 is a longitudinal cross-sectional view of the assembled transducer viewed along line 4—4 of FIG. 3, with certain elements omitted for clarity of viewing.

Figure 5:
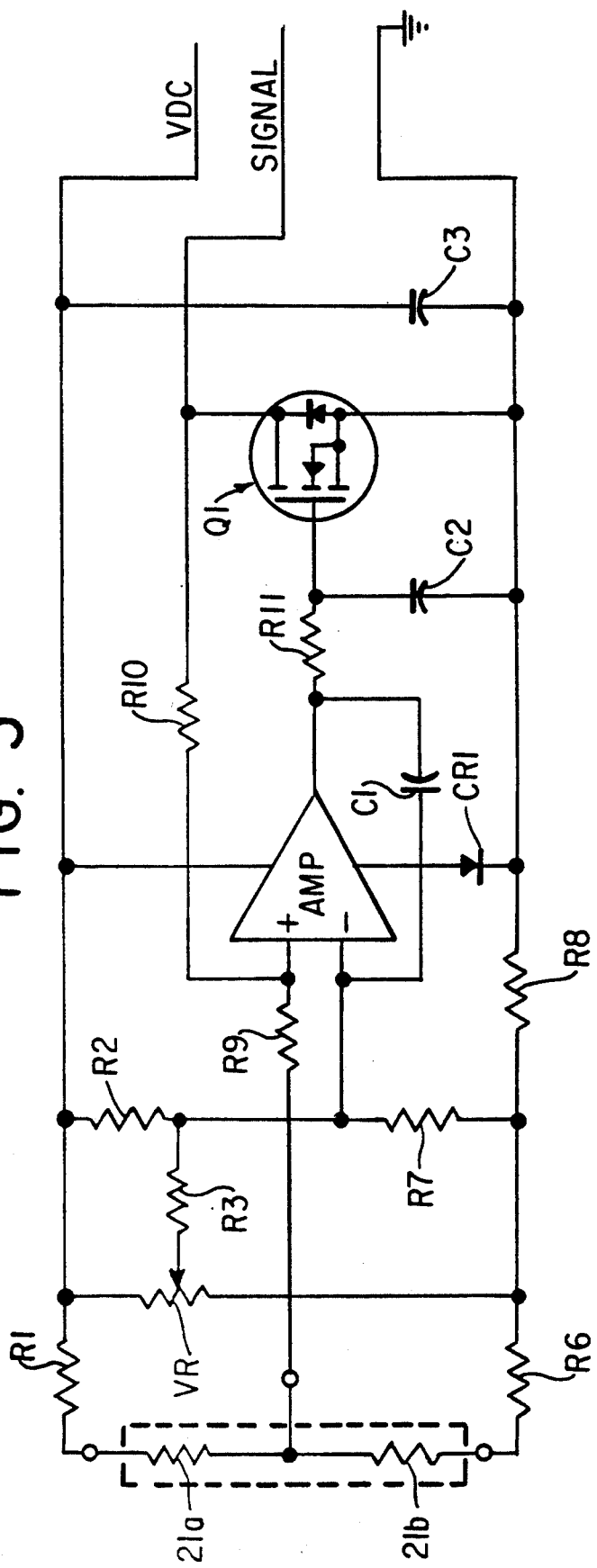
FIG. 5 is a circuit diagram for the printed circuit board of the invention.

Referring to the drawings, the transducer comprises the following main components:

diaphragm and beam housing 11
gasket washer 13
flexible diaphragm 15
plunger 17
beam structure 19
strain gage element 21
base header 23 having insert-molded terminals 25
spacer 27
circuit board 29
terminal base 31 having prong-like terminals 109
connector body 33.

The present invention is illustrated as a pressure transducer or oil pressure sender for automotive engines, for which it is particularly adapted.

The housing 11 has a bore 41 extending therethrough communicating at its upper end with a central space 42. The housing 11 is made of a strong rigid material, preferably steel. The lower part of the housing has external threads 43 adapting the device to be screwed into a pressure manifold or other source of pressure to be detected or measured, to communicate with bore 41 and space 42 at its end. The housing 11 is also provided with a hexagonal section 45 facilitating use of a wrench for tightening the transducer in a wall of the pressure source. Extending upwardly from the threaded portion 43 is an integral outer sleeve or skirt 47 which as described below is utilized to retain parts of the assembly together. The housing 11 also has an annular seat 63(a), not shown in FIG. 1 within the sleeve 47 surrounding a coaxial annular projecting rib 51 separated from the central space 42 by an annular area 49 surrounding the space 42. Annular flat 49 rims a raised central portion 54. As is readily seen, the housing 11 is particularly adapted for simple fabrication by conventional screw machine techniques.

An annular gasket washer 13 is adapted to rest on the annular region 49. Gasket 13 may be made of any slightly compressible material suitable for use as a seal, such as an ethylene acrylic elastomer. The gasket 13 provides part of a sealing arrangement between parts held together firmly to retain the pressure being measured. Overlying the gasket 13, annular flat region 49, raised portion 54, and the space 42 of the housing 11 is the diaphragm 15, of circular disc form. This diaphragm may be of a low cost flexible material suitable for oil pressure applications, such as polyamide, sold by the Dupont Company under the brand name Kapton, with a thickness between 0.003 and 0.005 inch. The diaphragm and gasket materials may vary, and are selected to be compatible with the medium whose pressure is being sensed and with the environmental conditions (e.g., temperature) in which the transducer must operate.

The unitary beam supporting structure 19 (made of a rigid machinable material such as steel) is formed with a disk-like portion 60 at its top as seen in FIG. 3, with a generally cylindrical rigid side wall not shown in FIG. 3 having a large central cylindrical downward-extending depression 61. The beam structure sidewall 62 has a lower annular surface 63 engaging the peripheral portion of the diaphragm 15 and serving to clamp the diaphragm 15 against the annular flat 49 of the housing 11, with the gasket 13 therebetween. The lower surface of the beam-supporting structure 19 is also formed with a groove 65 in which is seated the annular rib 51 as an aid in centrally locating the components. The beam-supporting structure 19 is also provided with a peripheral flange 67 which seats against the annular space 63a of the housing 11. The thickness of flange 67 is kept to a minimum and it is located as far as possible from beam 20 in order to minimize the creation of stresses in beam 20 during crimping of housing sleeve 47 at assembly as well as during wrenching of the sender into its final application location. The structure 19 is also formed with an annular shoulder or ledge 71 having an undercut 73.

As seen particularly in FIG. 1, the beam 20 is formed by milling two slots 22 separated by the desired width of the beam through the top disk-like portion 60 of the beam structure 19, leaving the beam 20 joined at each end to the structure 21. It will be understood that the thickness of this disk portion 60 of the beam structure 19 and its width are chosen in relation to the modulus of elasticity of the material (preferably steel) to provide the desired compliance of the beam with respect to applied pressure against the diaphragm 15.

It will be seen from the description just given of the beam support structure 19 that it is readily fabricated by conventional screw machine operation plus conventional straddle milling, both of which can be readily held to desired tolerances, so as to provide a simple and economical method of fabricating the beam structure.

The top disk 60 of the beam structure 19 has a downwardly extending coaxial central projection 75 of generally cylindrical shape, which engages a cavity in the top of a plunger 17 with a forced or pressed fit to join plunger 17 integrally with the beam structure. Plunger 17 rests on the central part of the diaphragm 15 which forms one wall of the cavity or space 42 containing the medium under pressure. The plunger 17 transmits any force applied to the diaphragm 15 to the beam by way of the projection 75. Projection 75 serves to stiffen the central portion of the beam 20. The plunger 17 and beam structure 19 are rigidly connected providing stability against variation of performance as a result of vibration, shock or the like. The bottoms of the plunger and beam supporting structure are co-planar.

The annular gap between the outer diameter of the plunger and the inner diameter of the beam structure is controlled to accommodate slight variations in the position of the face of the plunger relative to the face of the base of the beam structure, which may occur due to unavoidable manufacturing variations and tolerances. This gap may be about 0.03 inch. This arranges that the diaphragm remains in intimate contact with the full surface of the plunger during deflection of the beam, thus providing full translation of input pressure to a force on the plunger which is essentially proportional to the magnitude of the pressure acting on the diaphragm. This force is substantially equal to the pressure times the area of the plunger.

Flexible diaphragm materials such as those used herein may, over the course of time and because of being subjected to stress, tend to take a permanent deformation in the direction of the stress. The narrowness of the cylindrical space between the plunger 17 and the inner wall of beam structure 19 aids in avoiding distortion or destruction of the diaphragm. By the present design and smallness of the gap the diaphragm will only slightly if at all bulge into the annular gap when pressure is applied. This bulge may even become a permanent feature of the diaphragm, but since the surface of the plunger is co-planar with the surface of the base of the beam structure, even such a permanent deformation will not affect long term stability.

Mounted on the beam 20 are variable resistive elements 21a, 21b of piezo-resistive semiconductor material, which may be formed as a single narrow strip 21 of silicon such as a single B-type crystal having an orientation along its longitudinal axis, with a resistivity of 0.010 to 0.16 ohm/cm, with less than 100 dislocations per $cm^2$, and with resistance of about 700–1000 ohms. The thickness of the strip is desirably between about 0.0005 and 0.0015 inch, as required for providing the desired resistance range. In one example the strip may have a length of approximately 0.2 inches and a width of approximately 0.01 inch. The piezo-resistive elements are preferably cemented to the beam, as by high-temperature epoxy, but may be joined to the beam in other ways, such as by being deposited thereon. The strip 21 may be provided with metallized pads 24 suitable for wire bonding. These pads are preferably formed by deposition of metal (e.g. gold) onto the silicon so that they maintain ohmic contact with the silicon material over a wide range of temperatures. Preferably the strip should have smooth edges and be free from minute cracks such as may be produced by cutting or chemically etching the strip to proper dimension. The silicon piezo-resistive elements 21a, 21b may be provided with a protective organic overcoat, to isolate the silicon material from environmental effects or contaminants which might tend to compromise performance. The leads 87 for the piezo-resistive elements 21a, 21b are suitably connected to pads 24 at each end of the silicon strip 21 and at its center, so as to produce equal resistances for the two halves 21a, 21b in the unstressed state. The silicon strip 21 is preferably mounted between the center and one end of the beam 20 so that on stressing, upon beam deflection caused by applied pressure, one portion (e.g., 21a) of the strip will increase in resistance and the other portion (e.g., 21b) will decrease in resistance. The projection 75 on the beam structure 19 causes a center portion of the beam to be stiffer than the ends of the beam to maximize the desired action on the silicon elements.

Placed over the beam structure 19 is the header 23 having a cylindrical side wall 81 with an outwardly extending lower flange 83 which sits on the annular ledge 71 of the beam support 19. The header 23 is of insulating material, typically molded from glass fiber reinforced polyester or similar material. Molded into it are three electrical contacts 85, respectively joined by soldering or other means to wire leads 87 secured to the pads 24 on the piezo-resistive strain gage elements 21a, 21b. Where desired, the wires 87 may be eliminated, and the contacts 85 made resilient and formed to rest on the pads 24, making electrical contact therewith by being held resiliently in contact thereto.

The housing 11, gasket 13, diaphragm 15, beam support 19 with attached plunger 17 and header 23 are held together within the housing sleeve 47 with a rigid (e.g., metallic) spacer 27. The spacer 27 has one end 91 resting on and engaging the flange 67 of the beam structure 19. It also has an inwardly directed flange 93 at its upper end which engages the flange 83 of the header 23. With the header 23, beam structure 19, spacer 27 and housing 25 assembled together, the upper edge of the housing sleeve 47 is peened over the spacer 27, and thereby retains all these parts together in a rigid assembly.

It will be seen that in this assembly, the diaphragm 15 is provided with a strong seal against the housing 11 with gasket 13 therebetween. The housing skirt holds the spacer end 91 firmly against the beam structure flange 67 seated on housing surface 63. The bottom surface of the beam structure 19 is flat except for annular groove 65. The annular horizontal surface 49 of the housing 11 inside of the annular ridge 51 is machined to a tightly controlled depth slightly below the outside seating surface 63 thus creating a space allowing for the desired compressed thickness of the gasket and diaphragm. By controlling precisely the depth of this surface 49, in relation to the gasket thickness and the diaphragm thickness, the resulting compression of the gasket upon assembly (which is the most critical factor in sealing) is accurately controlled. Preferably, the region of the housing top surface 54 inward from the gasket-supporting area 49 toward the center is raised slightly for properly locating and readily capturing the washer-shaped gasket during assembly.

By virtue of this arrangement, on assembly and crimping the annular skirt of the housing over the spacer, header and beam structure, with the diaphragm and gasket washer in place, the bottom annular surface of the beam structure seats into the sealing area of the housing with a metal-to-metal contact, leaving a precisely controlled space for the gasket and diaphragm so that the gasket is compressed to the desired extent to provide the required seal reliability. This results in the seal being substantially completely insensitive to variation in closing forces during assembly. In addition, the conformation of the annular rib 51 in the groove 65 and the flange 67 on the annular surface 63 provide enhancement for the seal, creating an overall rugged seal for containing the pressure medium within the bore 41 and cavity 42.

This configuration thus has a single flat surface on the beam structure which acts both as a compression element against the diaphragm and gasket and as a stop to limit and control the degree of compression of the gasket resulting in a highly reproducible seal of the medium to be sensed. Further, since all elements of the crimped stack (housing, beam structure and spacer) are metal, there is no tendency for long term creep and subsequent loosening as would be the case if plastic or elastomeric components were part of the crimped stack.

The header 23 is formed with a pair of axially extending outer arms 101 each having a groove 103 on its inner surface. A printed circuit board 29 is engaged and retained within the grooves 103 and has input contacts 105 which engage the terminals 85 of the header and may be soldered thereto or resiliently engaged therewith. Board 29 may be secured to header 23 by epoxy cement. The printed circuit board 29 may carry resistors forming with piezo resistive elements 21a, 21b a conventional Wheatstone bridge circuit (described below) having output at contacts 107.

A terminal base 31 of insulating material (e.g., glass fiber reinforced polyester) has molded in it three-blade-like prongs 109 whose lower portions are juxtaposed to the board terminals 107, to which they are kept in electrical contact, either by resiliency or by soldering. The terminal base 31 also includes depending ears 113 to which the printed circuit board 29 is secured, as by plastic pins or rivets indicated at 119 or by epoxy cementing. A connector body 33 surrounds the header 23, printed circuit board 29 and terminal base 31, with an oval extension 111 for guiding a plug or receptacle of comparable contour (not shown) into contact with the blade terminals 109. The body 33 may be retained in position and sealed either by a pressed fit or by cementing to the header 23 at the lower end of body 33 and terminal base 31 at its upper end.

By way of example, the transducer may have a diameter of about 1 inch and length of about 3 inches. The beam may have a width of about 0.125 inch and a thickness of about 0.035 inch. The diaphragm may have a thickness of about 0.003 inch. The gasket may have a thickness of about 0.032 inch. The plunger may have a diameter of about 0.436 inch and fit within a beam structure opening of about 0.496 inch diameter to leave a gap of about 0.03 inch between them.

A schematic diagram for the circuit on the circuit board is shown in FIG. 5, in one embodiment designed to drive a conventional galvanometer-type oil pressure gage having a nominal 447 ohm resistance for its control coil and a nominal 175 ohm resistance for its reference coil. This circuit when coupled with the pressure-sensing transducer element of the present invention is designed to rotate the oil pressure gage indicator through 90 degrees, or change from zero current to 21.8 milliamperes upon intended increase of oil pressure, with a 13.8 volt power supply.

The circuit has a first stage consisting of the silicon piezo-resistive sensing elements 21a, 21b and combined with passive resistors R2 and R7 to form a Wheatstone bridge. Passive resistors R1, R6 are in series respectively with sensing elements 21a, 21b serve for temperature compensation and span determination. Variable potentiometer VR serves to zero balance and to set zero for the bridge circuit. The output of the bridge is supplied to operational amplifier stage AMP with passive resistor gain adjustment, including a reverse-polarity protection diode CR1. The third stage is a MOS transistor amplifier Q1 to provide sufficient current to operate the gage control coil. Capacitors C1, C2, C3 stabilize the feedback circuit and reduce interference effects. In operation input pressure deflects the beam to cause elements 21a, 21b to vary oppositely in resistance. The resulting change in bridge output is amplified to control the pressure gage. An unamplified signal may alternately be directed to a separate control module in the vehicle (not shown) and the signal processed to drive a digital display or may be amplified there to drive the gage.

The circuit alternatively can be carried on a thick film hybrid ceramic circuit board with fixed resistors integrally deposited thereon and with active components mounted to the board. This construction permits the adjustment of the resistors to their correct values by trimming, typically through the use of a laser beam which burns away a portion of the deposited resistor. A variable potentiometer is not required with this construction.

The present invention thus provides a rugged compact pressure transducer, particularly useful as an oil pressure sender, using components simple and economical to fabricate and construction details suited to high production rate and automated assembly, with excellent reproducibility and resistance to process variations in mass production, and having relatively high performance.

It will be understood that simple changes may be made in the above apparatus without departing from the principles of the invention, and the above description and drawing should be interpreted as being illustrative and not in a limiting sense.

What is claimed is:

1. A beam structure for a pressure transducer comprising:
   a unitary axially symmetrical body with a hollow generally cylindrical side wall and a flat end disk, said side wall terminating at one end with said end disk;
   said side wall terminating at its end opposite said end disk in a generally planar annular surface; and
   said end disk having two parallel spaced slots extending through said end disk symmetrically on either side of a diameter of said end disk, to form a beam between said slots joined at each end to said body and deflectable upon application of force against said end disk.

2. A structure as in claim 1, further comprising a plunger coaxially within and closely spaced to said side wall and unitary at one end with said beam, the surface of said plunger at its other end being substantially co-planar with said side wall annular surface.

3. A structure as in claim 2, further comprising a diaphragm in contact with said plunger's other end surface; whereby said diaphragm transmits any force applied to it directly to the plunger and is non-load bearing.

4. A structure as in claim 1, said disk having at the center of said beam a central generally cylindrical inwardly directed projection coaxial with said cylindrical side wall.

5. A structure as in claim 4 further including
   a plunger within said side wall and closely spaced thereto, said plunger being unitary with said projection and having a surface substantially co-planar with the end of said beam body opposite said end disk.

6. A structure as in claim 1 further comprising a pair of aligned piezo-resistive elements mounted on said beam.

7. A beam structure as in claim 5 in combination with:
   a housing having an interior space adapted to communicate with a source of pressure to be detected and having an outer cylindrical wall surrounding said beam structure,
   a diaphragm interposed between said beam structure and plunger on one side and said housing on the other side, and
   a seal interposed between said diaphragm and said housing.

8. A beam structure as in claim 6 wherein said piezo-resistive elements are entirely on one side of the center of said disk.

9. A pressure transducer comprising:
   a beam structure having a unitary axially symmetrical body with a hollow generally cylindrical side wall and a flat end disk, said side wall terminating at one end with said end disk;
   said side wall terminating at its end opposite said end disk in a generally planar annular surface;
   said end disk having two parallel spaced slots extending through said end disk symmetrically on either side of a diameter of said end disk, to form a beam between said slots joined at each end to said body and deflectable upon application of force against said end disk;
   said beam adapted to be deflected in response to pressure to be detected;

a piezo-resistive strip mounted on and extending along said beam on one side of the center of said beam, said piezo-resistive strip having a terminal pad at each end and a terminal pad at the center, whereby upon deflection of said beam, the resistance between said center pad and one end pad increases while the resistance between said center pad and the other end pad decreases;

a header generally of cylindrical conformation adjacent said beam, and having three contacts held thereby, each connected to a respective one of said terminals pads; and a circuit board, said board having a set of input terminals connected respectively to said contacts, and a set of output terminals.

10. A transducer as in claim 9 wherein said header has a pair of diametrically opposed axially extending arms, each arm having a groove therein at its surface facing the opposite arm, and said circuit board has two opposed edges, each in one of said grooves.

11. A transducer as in claim 10 said terminal base being connected to an edge of said circuit board opposite said header.

12. A transducer as in claim 9 further including a generally cylindrical hollow connector body surrounding said header and board, a terminal base within said connector body and spaced from said header, said terminal base having a set of terminal prongs carried thereby and adapted for connection to an external mating socket, said prongs being connected to said board output terminals, whereby said beam and printed circuit board provide a unitary pressure transducer and circuit therefor.

13. A sealed pressure transducer comprising a housing having a hollow space adapted to communicate with a source of pressurized medium to be sensed, and a beam supporting structure, said housing having a generally planar surface adapted to mate with a surface of said beam supporting structure, said housing surface having an outer annular seating surface section, an annular ridge concentrically within said seating surface section, and a gasket-seating annular area concentrically within said ridge, with said hollow space being within said gasket-seating area, said beam-supporting structure having a generally substantially flat surface mating with said housing surface, and also having a recessed annular groove mating with said ridge, a compressible gasket in said gasket-seating area, and a diaphragm of a flat disk shape over said hollow space and gasket-seating area, said beam structure having a flat surface area opposed to said gasket-seating area and spaced therefrom by the compressed thickness of said gasket plus the thickness of said diaphragm.

14. A transducer as in claim 13, wherein said diaphragm is flexible offering slight resistance to small movements caused by pressure applied to said beam.

15. A transducer as in claim 13, further including a plunger between said diaphragm and said beam structure.

16. A transducer as in claim 13 further including a spacer between said housing and said beam structure for positioning said beam structure in relation to said housing.

17. A transducer as in claim 13, further including a pair of piezo-resistive elements carried by said beam and having terminal pads thereon, a header member carrying contacts, each being connected to a respective terminal pad of said piezo-resistive elements, said header, beam structure, diaphragm, gasket washer and housing being held rigidly together.

18. A transducer as in claim 17 further including a pair of laterally opposed axially extending arms on said header member, each having an inward groove formed therein, a circuit board having opposed edges, each in a respective one of said grooves and having input terminals connected to said contacts, and output terminals, a terminal base at the end of said board opposite said header and joined to said board, said terminal base having a set of terminal prongs each connected to an output terminal of said board, and an enclosure surrounding said header, board and terminal base.

19. A pressure transducer comprising a housing having a hollow space adapted to communicate with a source of pressurized medium to be sensed, and a beam structure having an outwardly extending flange at one end, said housing having a generally planar surface adapted to mate with said beam structure, said surface having an annular seating surface section mating with said flange, a header structure juxtaposed to said beam structure opposite said housing and having an exterior flange, and a spacer engaging said header flange at one end and said beam structure flange at the other end, said housing having an integral skirt retaining said spacer against said flanges and thereby rigidly retaining together said header, said beam structure and said housing.

20. A transducer as in claim 19, said housing surface having a gasket seating area, a compressible gasket in said area, a diaphragm between said housing and beam structure and overlying said housing space and gasket, said beam structure having a surface portion opposed to said gasket seating area and spaced therefrom by the compressed thickness of said gasket plus the thickness of said diaphragm, when said header, beam structure and housing are retained together.

* * * * *